United States Patent
Dover

(10) Patent No.: US 12,468,862 B2
(45) Date of Patent: Nov. 11, 2025

(54) PARTITIONED CRYPTOGRAPHIC PROTECTION FOR A MEMORY SYSTEM

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

(*) Notice: Subject to any disclaimer, the term of this patent is extended or adjusted under 35 U.S.C. 154(b) by 181 days.

(21) Appl. No.: 18/351,982

(22) Filed: Jul. 13, 2023

(65) Prior Publication Data

US 2024/0061963 A1     Feb. 22, 2024

Related U.S. Application Data

(60) Provisional application No. 63/371,847, filed on Aug. 18, 2022.

(51) Int. Cl.
*G06F 21/79* (2013.01)
*G06F 21/60* (2013.01)

(52) U.S. Cl.
CPC .......... *G06F 21/79* (2013.01); *G06F 21/602* (2013.01)

(58) Field of Classification Search
CPC .............................. G06F 21/79; G06F 21/602
See application file for complete search history.

(56) References Cited

U.S. PATENT DOCUMENTS

| | | | |
|---|---|---|---|
| 2012/0084573 A1* | 4/2012 | Rudelic | G06F 12/1466 713/193 |
| 2014/0229745 A1* | 8/2014 | Asnaashari | G06F 3/0679 713/190 |
| 2017/0169233 A1* | 6/2017 | Hsu | G06F 16/215 |
| 2020/0401533 A1* | 12/2020 | Golov | G06F 12/1408 |

* cited by examiner

*Primary Examiner* — Ayoub Alata
(74) *Attorney, Agent, or Firm* — Holland & Hart LLP

(57) ABSTRACT

Methods, systems, and devices for partitioned cryptographic protection for a memory system are described. The method may include a host system generating a command to update a protection attribute of a first set of memory cells of the memory system, where the memory system includes multiple sets of memory cells, each set associated with a respective set of one or more first keys. The method may further include encrypting the command based on a second key corresponding to a first key within the respective set of one or more first keys, and transmitting, after encrypting the command, the command to the memory system to update the protection attribute of the first set of memory cells.

20 Claims, 9 Drawing Sheets

PARTITIONED CRYPTOGRAPHIC PROTECTION FOR A MEMORY SYSTEM

CROSS REFERENCE

The present application for patent claims priority to U.S. Provisional Patent Application No. 63/371,847 by Dover, entitled "PARTITIONED CRYPTOGRAPHIC PROTECTION FOR A MEMORY SYSTEM" and filed Aug. 18, 2022, which is assigned to the assignee hereof and is expressly incorporated by reference herein.

FIELD OF TECHNOLOGY

The following relates to one or more systems for memory, including partitioned cryptographic protection for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
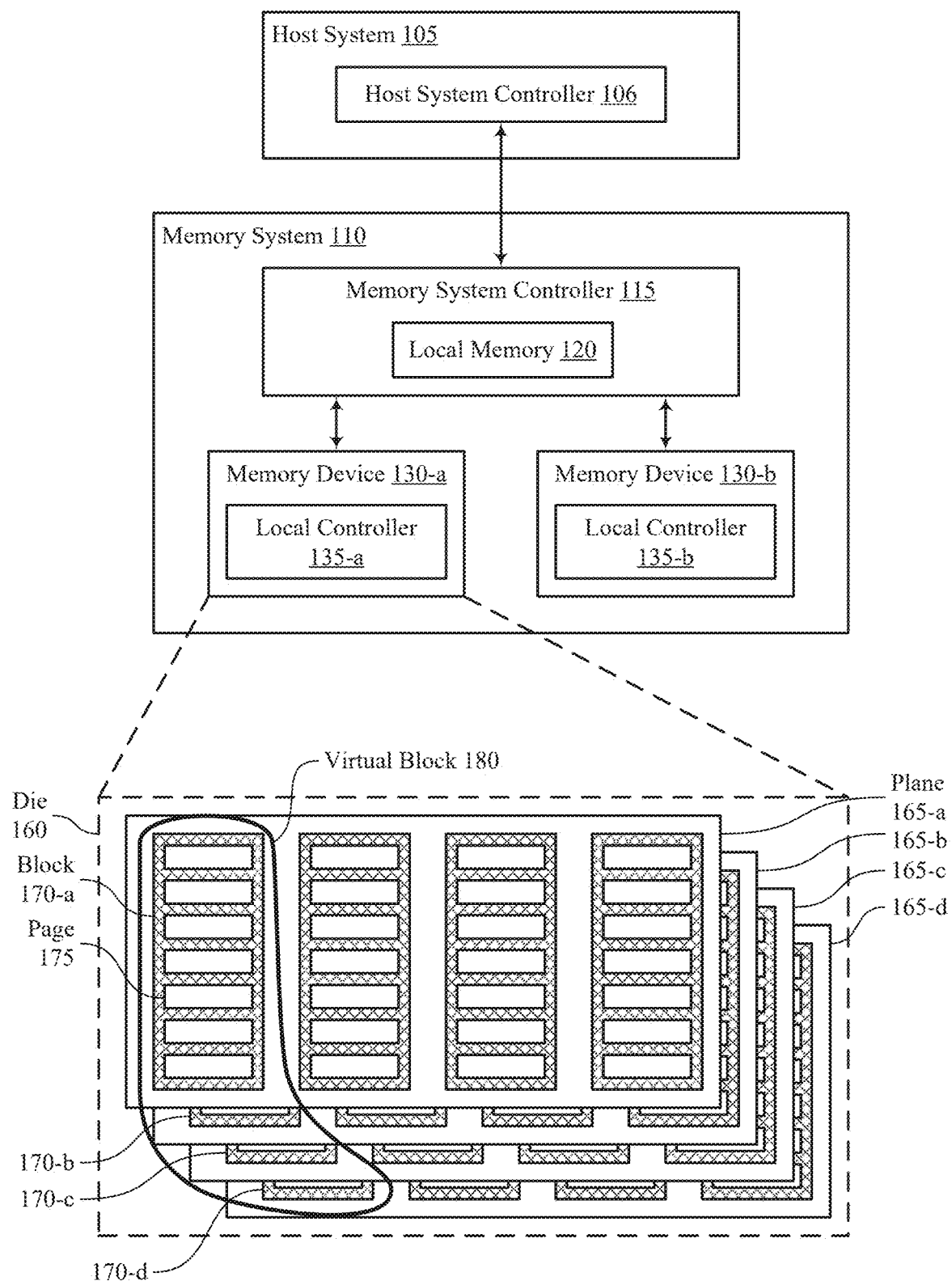
FIGS. 1 and 2 illustrate examples of a system that supports partitioned cryptographic protection for a memory system in accordance with examples as disclosed herein.

In some examples, multiple host systems may share a common memory system. That is, the multiple host systems may store and access data in the memory system, including potentially in the same memory array or same memory device within the memory system. In some examples, each host system of the multiple host systems may be allocated one or more ranges of memory cells within the memory system (e.g., one or more sets of memory cells, each associated with a corresponding address range), and one or more security operations may be employed to ensure that a host system cannot access a range of memory cells that is not allocated to that host system.

Some security techniques may involve implementing a memory management unit (MMU). The MMU may allow the memory system to logically separate multiple host systems. However, in some cases, the MMU may be bypassed, and a range of memory cells may be directly accessed by an attacker—that is, a host system to which the range of memory cells has not been allocated may access the range of memory cell by bypassing the MMU. Other security techniques may be based on the use of one or more passwords (e.g., cleartext passwords). In such an example, each host system may have an associated password and may utilize the password to access a corresponding range of memory cells. However, because such techniques may involve the communication of passwords between host systems and memory systems (e.g., over a bus), passwords may be vulnerable to snooping, such that an attacker may obtain a password by snooping associated signaling on a bus and use the snooped password to access a corresponding range of memory cells.

As described herein, cryptographic protection may be used for memory access in a multi-host system. In one example, a memory system may be in communication with a set of host systems. Each host system of the set of host systems may be associated with a respective first key and a respective range of memory cells within a memory array of the memory system. In some examples, the first key may be stored at the respective host system. Additionally, each range of the memory cells may be configured with a protection attribute. The protection attribute may be read-only, write-only, or neither. In some examples, the first key may be associated with a second key stored at the memory system. That is, the memory system may store a second key for each respective first key. In some examples, the first key and the corresponding second key may be an example of an asymmetric key pair or a symmetric key pair. In the case that the first key and the corresponding second key are an asymmetric key pair, the first key may be an example of private key and the second key may be an example of a public key.

To change or override (e.g., bypass) a protection attribute of a range of memory cells, the corresponding host system may encrypt a command to update the protection attribute of the range of memory cells using their first key and transmit the encrypted command to the memory system. The memory system may receive the command and use the second key associated with the first key to decrypt the command. The memory system may then update or override the protection attribute of the range of memory cells such that the host system may access the range of the memory cells of memory system. Such techniques may provide more robust protection operations for accessing memory in a multi-host system, among other possible benefits.

Features of the disclosure are initially described in the context of a system with reference to FIG. 1. Features of the disclosure are described in the context of a system and a process flow with reference to FIGS. 2 and 3. These and other features of the disclosure are further illustrated by and described in the context of an apparatus diagram and flowchart that relate to partitioned cryptographic protection for a memory system with reference to FIGS. 4 through 9.

FIG. 1 illustrates an example of a system 100 that supports partitioned cryptographic protection for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 and one host system 105 are shown in FIG. 1, the system 100 may include any quantity of host systems 105 and any quantity of memory systems 110. For example, multiple host systems 105 may share a memory system 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random-access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random-access memory (RAM) (FeRAM), magneto RAM (MRAM), NOR (e.g., NOR flash) memory, Spin Transfer Torque (STT)-MRAM, conductive bridging RAM (CBRAM), resistive random-access memory (RRAM), oxide-based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support partitioned cryptographic protection for a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

As described herein, a memory system 110 may be in communication with more than one host system 105. For example, the memory system 110 may be in communication with a first host system (e.g., the host system 105) and a second host system (not shown in FIG. 1). Each host system 105 may generate and store a respective key. For example, the first host system may generate and store a first key at a memory device of the first host system and the second host system may generate and store a second key at a memory device of the second host system. In some examples, each host system 105 may be associated with a set of memory cells of the memory array included in one or more memory devices 130. For example, the first host system may be associated with a first set of memory cells and the second host system may be associated with a second set of memory cells. Each set of memory cells may be configured with a protection attribute (e.g., read-only, write-only, or neither). In some examples, the memory system 110 may obtain a key for each key stored at the host systems. For example, the memory system 110 may obtain a third key corresponding to the first key and a fourth key corresponding to the second key. The key pairs (e.g., the first key and the third key) may be symmetric key pairs or asymmetric keys pairs. In order gain access the first set of memory cells, the first host system may generate a command to update the protection attribute of the first set of memory cells and encrypt the command using the first key. The first host system may then transmit the encrypted command to the memory system 110. The memory system 110 may decrypt the command using the third key and update the protection attribute of the first set of memory cells according to the command such that the first host system may gain access the first set of memory cells (e.g., using a subsequent read command or write command).

Figure 2:
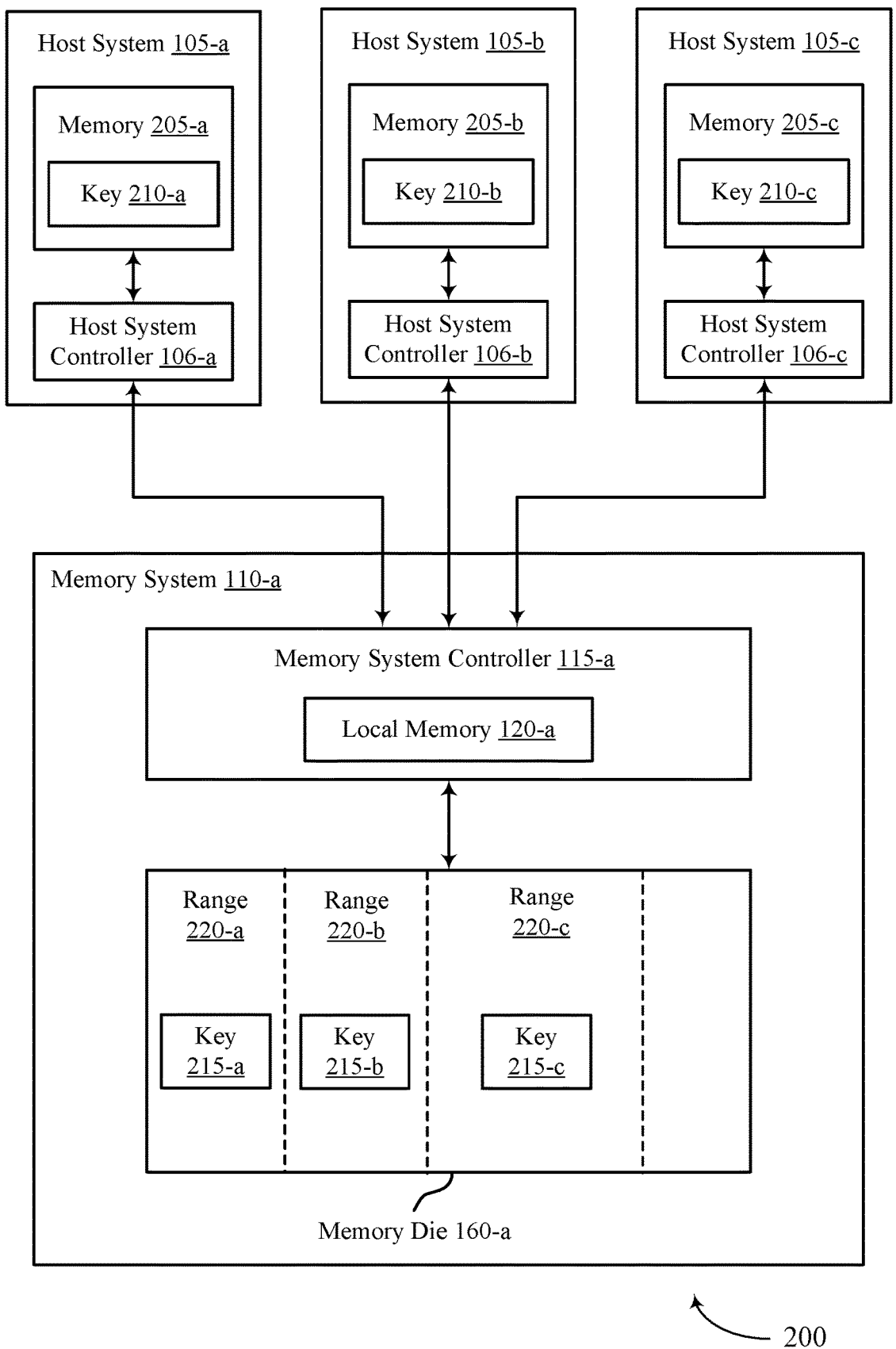

FIG. 2 illustrates an example of a system 200 that supports partitioned cryptographic protection for a memory system in accordance with examples as disclosed herein. In some examples, the system 200 may implement aspects of a system 100. For example, the system 200 may include host systems 105, host system controllers 106, a memory system 110-*a*, a memory system controller 115-*a*, a local memory 120-*a*, and a memory die 160-*a* which may be examples of host systems 105, host system controllers 106, a memory system 110, a memory system controller 115, a local memory 120, and a die 160 as described in FIG. 1, respectively.

In some examples, the system 200 may be an example of a multi-host system. In a multi-host system, more than one host system 105 may share a common memory system 110-*a*. In the example of FIG. 2, a host system 105-*a*, a host system 105-*b*, and a host system 105-*c* may share the memory system 110-*a*. In some examples, the host systems 105 may share the memory system 110-*a* by storing data in different ranges 220 (or portions) of the memory die 160 of the memory system 110-*a*.

In some examples, prior to performing an access operation, the host systems 105 and the memory system 110 may potentially exchange signaling (e.g., perform a handshake procedure) to establish one or parameters. In one example, the host system 105 and the memory system 110 may exchange signaling to define a range 220 for each host system 105. The range 220 may refer to a set (or portion) of memory cells located within the memory die 160-*a*. In some examples, the host system controller 106 of the host system 105 may determine a start address (e.g., a logical block address (LBA)) and length (e.g., transfer length)) and transmit signaling to the memory system controller 115-*a* of the memory system 110-*a* indicating the start address and length. The memory system controller 115-*a* may utilize the start address and length to determine the range 220 and allocate the range 220 to the respective host system 105. In some examples, all of the ranges 220 may be associated with a same size (e.g., 8 megabytes). In such case, the host system 105 may only signal the starting address or an index that differentiates its range 220 from ranges 220 of other host systems 105. The memory system controller 115-*a* may utilize the starting address or index along with the preconfigured size to determine the range 220 (e.g., location of the range 220 in the memory die 160) and allocate the range 220 to the respective host system 105. In another example, the host system 105 and the memory system 110 may be preconfigured with the ranges 220.

As shown in FIG. 2, the host system 105-*a* may be allocated the range 220-*a*, the host system 105-*b* may be allocated the range 220-*b*, and the host system 105-*c* may be allocated the range 220-*c*. In some examples, the ranges 220 may occupy a first portion of the memory die 160-*a* and a second portion (or remaining portion) of the memory die 160-*a* may be free to store other data or may not be associated with a protection attribute.

Additionally, the host system 105 and the memory system 110 may exchange signaling to define one or more keys or key pairs. In some examples, each host system 105 may generate a key 210 and store the key 210 in the memory 205 (e.g., local memory of the host system 105). For example, the host system 105-*a* may generate a key 210-*a*, the host system 105-*b* may generate a key 210-*b*, and the host system 105-*c* may generate a key 210-*c*. Additionally, the memory system 110-*a* may obtain a key 215 that corresponds to the key 210. For example, the memory system 110-*a* may obtain a key 215-*a* that corresponds to the key 210-*a*, a key 215-*b* that corresponds to the key 210-*b*, and a key 215-*c* that corresponds to the key 210-*c*. In some examples, the host system 105 may generate both the key 210 and the key 215 and transmit signaling to the memory system 110-*a* indicating the key 215. The memory system controller 115-*a* may store the keys 215 in the local memory 120-*a* or the memory system controller 115-*a* may store each key 215 in their respective ranges. For example, the memory system 110 may store the key 215-*a* in the range 220-*a* which is associated with the host system 105-*a*.

In some examples, the key 210 and the key 215 may be an example of an asymmetric key pair. That is, the key 215 and the key 210 may be different from one another. Additionally, in such case, the key 210 may be an example of a private key and the key 215 may be an example of a public key. A public key is public knowledge and can be known to other devices (e.g., other host systems 105), whereas a private key is only known to the key initiator (e.g., the host system 105 that generates the private key). In asymmetric cryptography, a private key is used by a transmitting device to encrypt a message and the public key is used by a receiving device to decrypt the message. In another example, the key 210 and the key 215 may be an example of a symmetric key pair. In such example, the key 210 may be the same as the key 215 and both the key 210 and the key 215 may be examples of private keys. In yet another example, the key 210 and the key 215 may be an example of a symmetric key pair that is generated using an asymmetric Diffie Hellman key.

In another example, each of the ranges 220 may be associated with protection attribute. The protection attribute may define whether the range 220 includes memory cells that are read-only, write-only, or readable and writable. In one example, the range 220-*a* may be configured to be write-only, the range 220-*b* may be configured to be readable and writable, and the range 220-*c* may be configured to be read-only. In some examples, in order to access the range 220, an update may be made to the protection attribute, or the protection attribute may be overridden (e.g., bypassed). For example, in order to read data from the range 220-*c*, the range 220-*c* may be updated from write-only to read-only or readable and writable, or a protection attribute for the range 220-*c* may be overridden such that data is read from or written to the range 220-*c* despite the protection attribute. To change or override the protection attribute of the range 220, the memory system 110-*a* may receive a command from the host system 105. In some examples, an update or override of a protection attribute for a range 220 may be temporary (e.g., may be operable for a limited duration, which may be preconfigured or indicated by the command). However, to avoid a malicious device (e.g., a host system 105 that is not allocated the range 220) changing the protection attribute of the range 220, the memory system 110 may verify that the command did not come from the malicious device before allowing the change to the range 220.

In one example, the host system 105-*a* (e.g., using the host system controller 106-*a*) may generate a command indicating to change or override the protection attribute of the range 220-*a*. After generating the command, the host system 105-*a* may encrypt the command using the key 210-*a* and transmit the encrypted command to the memory system 110-*a*. The memory system 110-*a* may attempt to decrypt the encrypted command using the key associated with the range 220-*a* (e.g., the key 215-*a*). Because the key 215-*a* is paired with the key 210-*a*, the memory system 110-*a* may successfully decrypt the encrypted command and change or override the protection attribute of the range 220-*a*. In some examples, the range 220 may be shared between two or more host systems 105. As an example, the range 220-*a* may be shared between the host system 105-*a* and the host system 105-*b*. In such example, the memory system 110-*a* may verify the command to update the protection attribute for the range 220-*a* if the command is encrypted using the key 210-*a*, the key 210-*b*, or both.

As described above, the command may allow host system 105 to temporality override the protection attribute. In such example, the command may include an access command (e.g., a read command or a write command). As one example, the range 220-*a* may initially be configured to be read-only. In such case, the memory system 110-*a* may receive a write command (e.g., encrypted using the key 210-*a*) from the host system 105-*a* and after decrypting the write command, determine to override the read-only protection attribute during execution of the command. During the execution of the command the protection attribute may still be active for all other host systems 105. Alternatively, the memory system 110-*a* may first update the protection attribute using the command and then receive the access command to access the range 220.

In some examples, it may be possible for a malicious device to decipher the key 210 if given enough time. As such, the memory system 110 and the host system 105 may update the key 210 and the key 215 in response to an event trigger or a schedule. In some examples, the host system 105-*a*, the memory system 110-*a*, or both may initiate a timer upon transmitting/or receiving a command encrypted with the key 210. After a duration of the timer, the host system 105-*a* may update the key 210 and consequently, the memory system 110-*a* may obtain a new key 215 that corresponds to the updated key 210. In some examples, the duration of the timer may be 24 hours.

Figure 3:
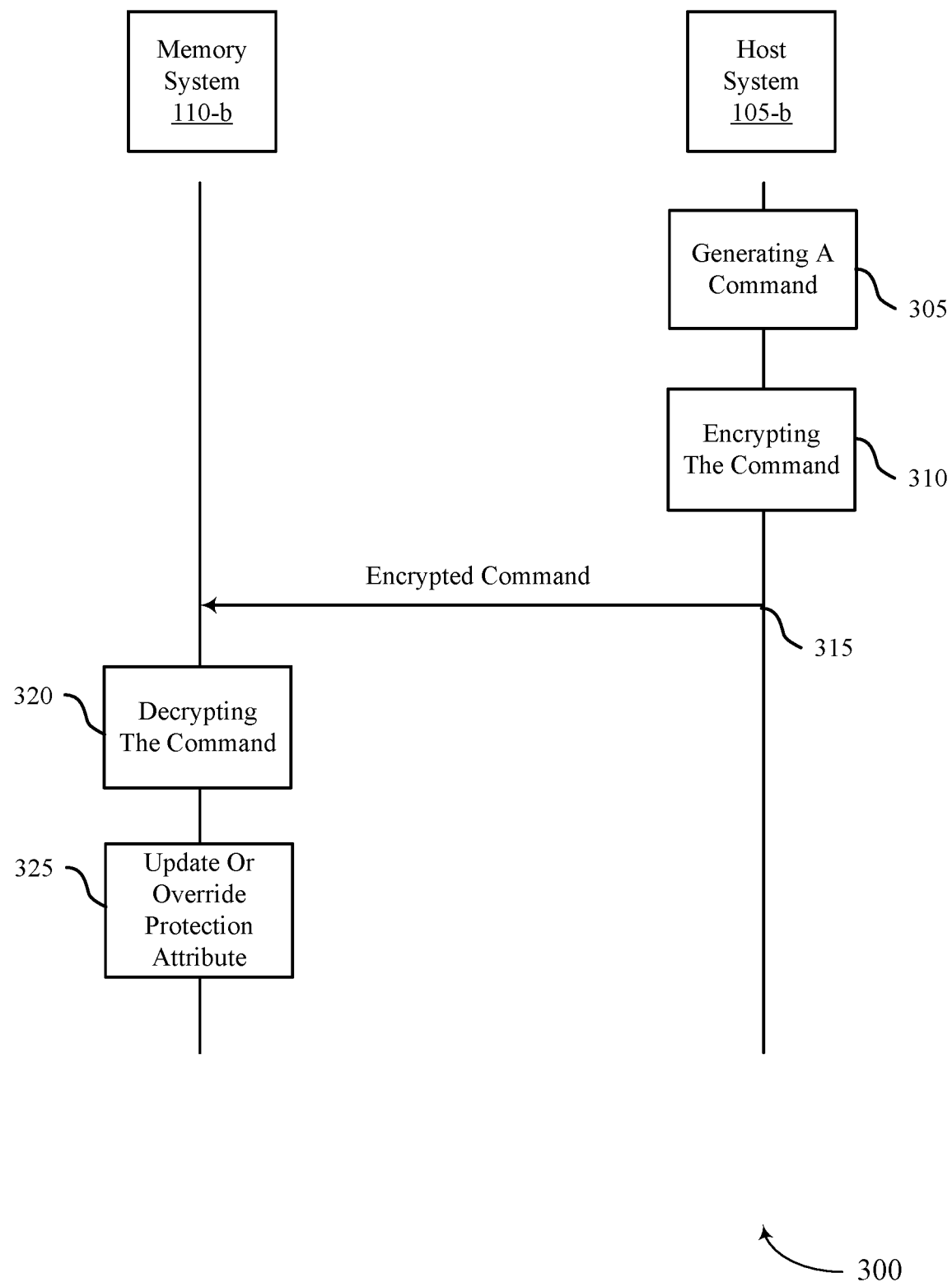
FIG. 3 illustrates an example of a process flow that supports partitioned cryptographic protection for a memory system in accordance with examples as disclosed herein.

FIG. 3 illustrates an example of a process flow 300 that supports partitioned cryptographic protection for a memory system in accordance with examples as disclosed herein. In some examples, the process flow 300 may be implemented by aspects of a system 100 and a system 200. For example, the process flow 300 may include a memory system 110-*b* and a host system 105-*b* which may be examples of a memory system 110 and a host system 105 as described with reference to FIGS. 1 and 2. Alternative examples of the following may be implemented, where some steps are performed in a different order than described or are not performed at all. In some cases, steps may include additional features not mentioned below, or further steps may be added.

At 305, the host system 105-*b* may generate a command to update or override a protection attribute of a first set of memory cells of a memory system 110-*b*. In some examples, the memory system 110-*b* may be shared by set of host systems 105 and each host system 105 of the set of host systems 105 may be associated with one or more corresponding sets of memory cells of the memory system 110-*b*. Additionally, each of the sets of memory cells of the memory system 110 may be associated with one or more first cryptographic keys. The command to update the protection attribute may include a command to update the first set of memory cells to be read-only, write only, or readable and writeable. Alternatively, the command may include a command to override the protection attribute of the first set of memory cells. In such example, the command may be included in a command to access one or more memory cells of the first set of memory cells (e.g., a read command or a write command) and the override may last for a duration of the execution of the access command. In some examples, prior to generating the command, the host system 105-*b* may transmit signaling indicating the first set of memory cells is associated with the host system 105-*b*. The signaling may include a starting address (e.g., LBA) corresponding to an endpoint of an address range for the first set of memory cells and a length of the address range (e.g., transfer length).

At 310, the host system 105-*b* may generate a second cryptographic key associated with the host system 105-*b* and encrypt at least a portion of the command using the second cryptographic key associated with the host system 105-*b*. In some examples, the host system 105-*b* may additionally generate a first cryptographic key associated with the second cryptographic key associated with the host system 105-*b* and transmit the first cryptographic key to the memory system 110-*b*. The memory system 110-*b* may store the first cryptographic key in the first set of memory cells. The first cryptographic key and the second cryptographic key may be an example of an asymmetric key pair, where the second cryptographic key may be an example of a private key and the first cryptographic key may be an example of a public key. In another example, the first cryptographic key and the second cryptographic key may be an example of a symmetric key pair (e.g., generated using Diffie Hellman). In some examples, the memory system 110-*b* may be shared by the host system 105-*b* and a second host system. In such example, at least a second portion of the command may be encrypted using a third cryptographic key associated with the second host system. In some examples, the host system 105-*b* or the memory system 110-*b* may update the first cryptographic key or the second cryptographic key in response to a trigger event or a schedule.

At 315, the host system 105-*b* may transmit the encrypted command to the memory system 110-*b*. In some examples, upon transmitting the encrypted command to the memory system 110-*b*, the host system 105-*b* may initiate a timer. If the timer expires, the host system 105-*b* may update the second cryptographic key associated with the host system 105-*b* and consequently, the memory system 110-*b* may update the first cryptographic key associated with the second cryptographic key. In some examples, along with the encrypted command, the host system 105-*b*, may transmit a password (e.g., cleartext password) to the memory system 110-*b*.

At, 320, the memory system 110-*b* may decrypt the command using the first cryptographic key associated with the second cryptographic key and potentially, the password. In the case that the memory system 110-*b* is shared by the host system 105-*b* and a second host system, the memory system 110-*b* may decrypt the command using one or both of the first cryptographic key associated with the second cryptographic key associated with the host system 105-*b* or an additional first cryptographic key associated with the third cryptographic key associated with the second host system.

At 325, the memory system 110-*b* may update or override the protection attribute of the first set of memory cells in response to the command. As on example, the memory system 110-*b* may update the first set cells from read-only memory cells to write-only memory cells. In some examples, subsequent to updating the protection attribute, the memory system 110-*b* may receive an access command from the host system 105-*b*.

Figure 4:
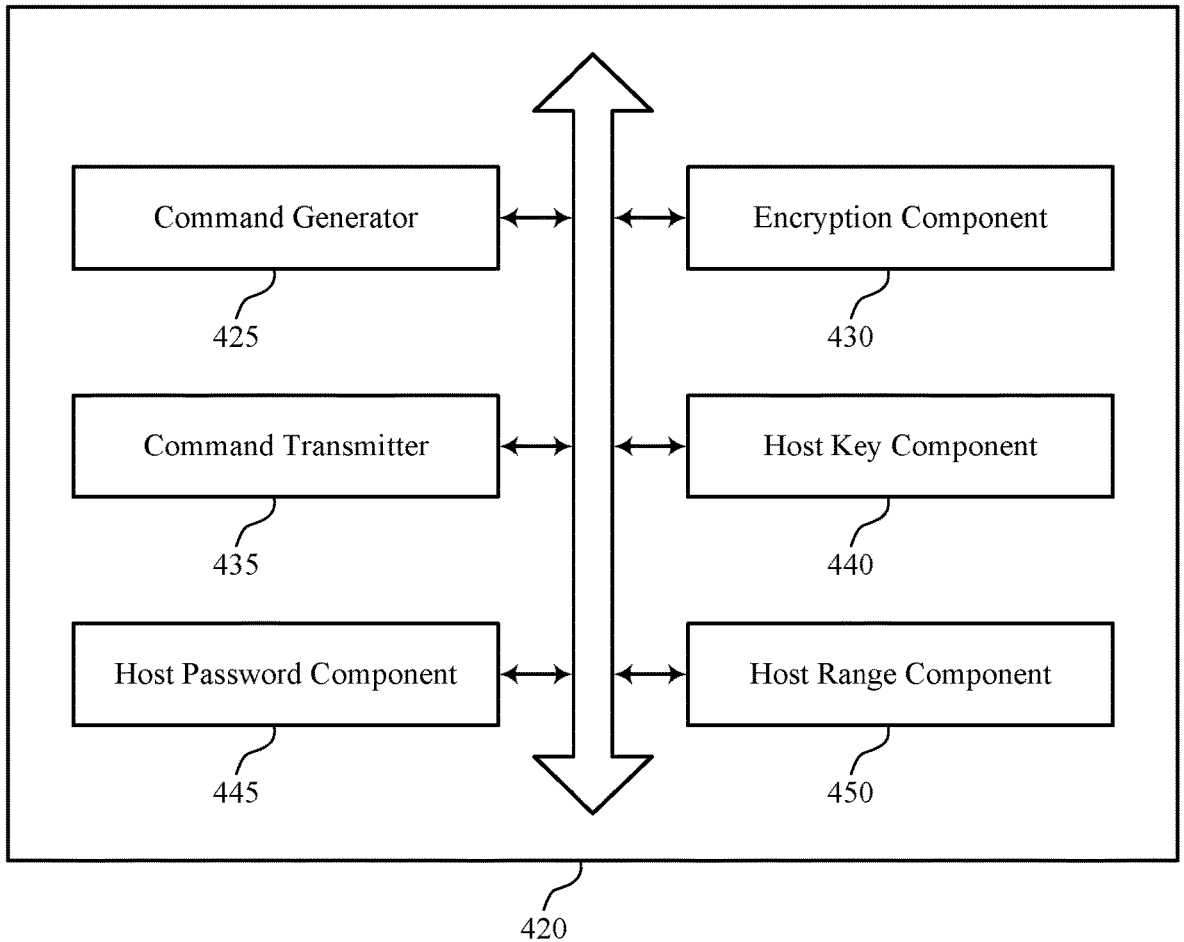
FIG. 4 shows a block diagram of a host system that supports partitioned cryptographic protection for a memory system in accordance with examples as disclosed herein.

FIG. 4 shows a block diagram 400 of a host system 420 that supports partitioned cryptographic protection for a memory system in accordance with examples as disclosed herein. The host system 420 may be an example of aspects of a host system as described with reference to FIGS. 1 through 3. The host system 420, or various components thereof, may be an example of means for performing various aspects of partitioned cryptographic protection for a memory system as described herein. For example, the host system 420 may include a command generator 425, an encryption component 430, a command transmitter 435, a host key component 440, a host password component 445, a host range component 450, or any combination thereof. Each of these components may communicate, directly or indirectly, with one another (e.g., via one or more buses).

The command generator 425 may be configured as or otherwise support a means for generating, at a host system, a command to update or override a protection attribute of a first set of memory cells of a memory system, where each of a plurality of sets of memory cells of the memory system is associated with a respective set of one or more first cryptographic keys. The encryption component 430 may be configured as or otherwise support a means for encrypting at least a portion of the command based at least in part on a second cryptographic key associated with the host system, the second cryptographic key corresponding to a first cryptographic key within the respective set of one or more first cryptographic keys associated with the first set of memory cells. The command transmitter 435 may be configured as or otherwise support a means for transmitting, after encrypting at least the portion of the command, the command to the memory system to update the protection attribute of the first set of memory cells.

In some examples, the host key component 440 may be configured as or otherwise support a means for updating the second cryptographic key based at least in part on a trigger event or a schedule.

In some examples, each of the plurality of sets of memory cells of the memory system is associated with a respective cleartext password, and the host password component 445 may be configured as or otherwise support a means for transmitting, in association with the command to update the protection attribute of the first set of memory cells, a cleartext password associated with the first set of memory cells. In some examples, the first set of memory cells is shared by the host system and a second host system.

In some examples, the encryption component 430 may be configured as or otherwise support a means for encrypting at least a second portion of the command based at least in part on a third cryptographic key associated with the second host system, the third cryptographic key associated with an additional first cryptographic key associated with the first set of memory cells.

In some examples, the command is to update the protection attribute of the first set of memory cells, the command including a command to update the first set of memory cells to be read-only memory, a command to update the first set of memory cells to be write-only memory, or a command to update the first set of memory cells to be writeable or readable memory.

In some examples, the command is to override the protection attribute of the first set of memory cells, the command including a read command or a write command.

In some examples, the host range component 450 may be configured as or otherwise support a means for transmitting signaling indicating that the first set of memory cells is associated with the host system.

In some examples, to support transmitting the signaling, the host range component 450 may be configured as or otherwise support a means for transmitting a logical block address corresponding to an endpoint of an address range for the first set of memory cells and an indication of a length of the address range.

In some examples, the host key component 440 may be configured as or otherwise support a means for storing the second cryptographic key in memory included in the host system. In some examples, the first cryptographic key includes a public key, and the second cryptographic key includes a private key. In some examples, the first cryptographic key and the second cryptographic key include a same key.

In some examples, the host key component 440 may be configured as or otherwise support a means for generating a symmetric key based at least in part on a Diffie-Hellman asymmetric key pair associated with the host system and the first set of memory cells, where the first cryptographic key and the second cryptographic key include the symmetric key.

In some examples, the memory system is shared by a plurality of host systems that are each associated with one or more corresponding sets of memory cells of the memory system.

Figure 5:
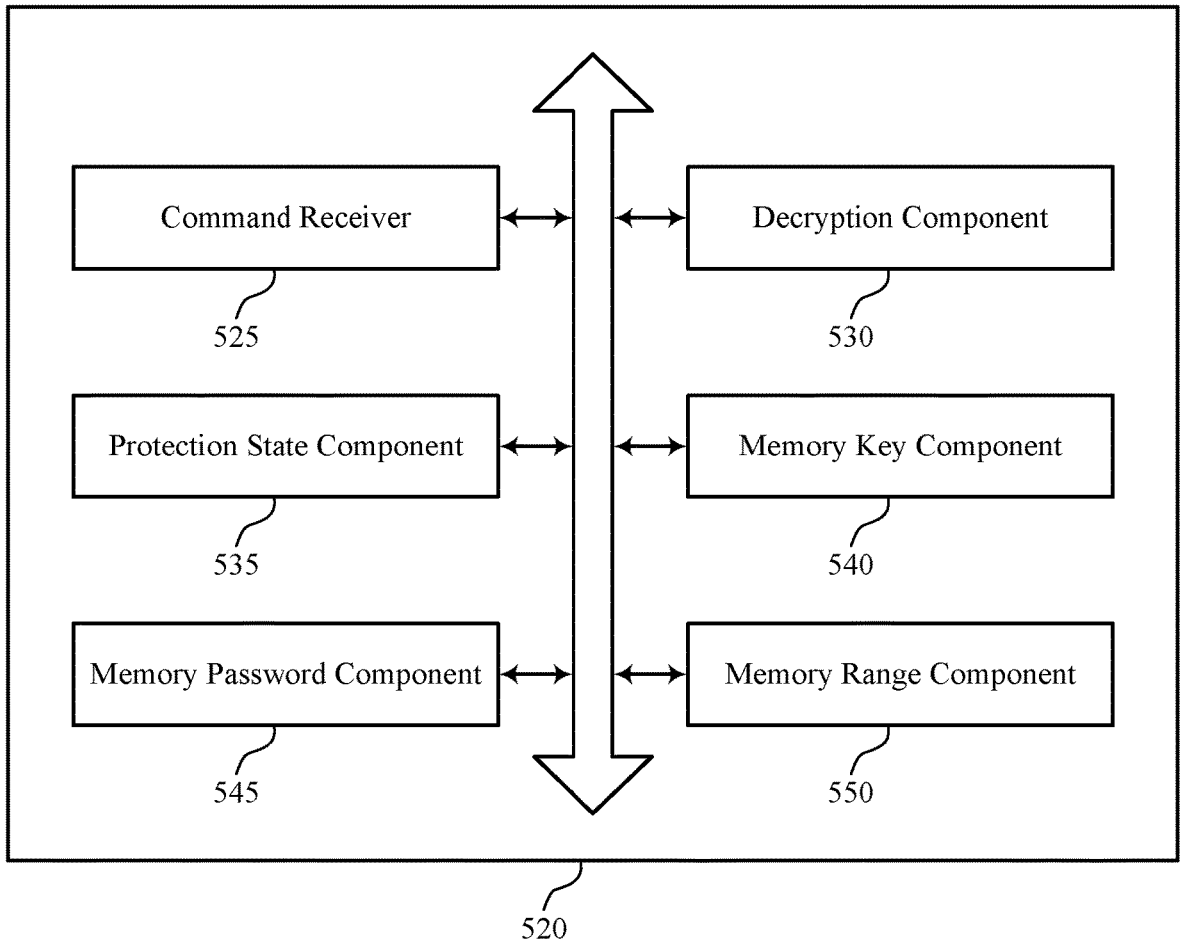
FIG. 5 shows a block diagram of a memory system that supports partitioned cryptographic protection for a memory system in accordance with examples as disclosed herein.

FIG. 5 shows a block diagram 500 of a memory system 520 that supports partitioned cryptographic protection for a memory system in accordance with examples as disclosed herein. The memory system 520 may be an example of aspects of a memory system as described with reference to FIGS. 1 through 3. The memory system 520, or various components thereof, may be an example of means for performing various aspects of partitioned cryptographic protection for a memory system as described herein. For example, the memory system 520 may include a command receiver 525, a decryption component 530, a protection state component 535, a memory key component 540, a memory password component 545, a memory range component 550, or any combination thereof. Each of these components may communicate, directly or indirectly, with one another (e.g., via one or more buses).

The command receiver 525 may be configured as or otherwise support a means for receiving, from a host system, a command to update or override a protection attribute of a first set of memory cells of a memory system, where each of a plurality of sets of memory cells of the memory system is associated with a respective set of one or more first cryptographic keys, and where at least a portion of the command is encrypted. The decryption component 530 may be configured as or otherwise support a means for decrypting at least the portion of the command using a first cryptographic key within the respective set of one or more first cryptographic keys associated with the first set of memory cells, where the first cryptographic key corresponds to a second cryptographic key associated with the host system.

In some examples, the memory key component 540 may be configured as or otherwise support a means for updating the first cryptographic key based at least in part on a trigger event or a schedule.

In some examples, each of the plurality of sets of memory cells of the memory system is associated with a respective cleartext password, and the memory password component 545 may be configured as or otherwise support a means for receiving, in association with command to update the protection attribute of the first set of memory cells, a cleartext password associated with the first set of memory cells. In some examples, each of the plurality of sets of memory cells of the memory system is associated with a respective cleartext password, and the decryption component 530 may be configured as or otherwise support a means for decrypting the command using the cleartext password associated with the first set of memory cells.

In some examples, the first set of memory cells is shared by the host system and a second host system.

In some examples, the decryption component 530 may be configured as or otherwise support a means for decrypting at least a second portion of the command based at least in part on an additional first cryptographic key associated with the first set of memory cells, the additional first cryptographic key associated with a third cryptographic key associated with the second host system.

In some examples, the command is to update the protection attribute of the first set of memory cells and the protection state component 535 may be configured as or otherwise support a means for updating the protection attribute of the first set of memory cells based at least in part on decrypting at least the portion of the command. In some examples, to support updating the protection attribute, the protection state component 535 may be configured as or otherwise support a means for updating the first set of memory cells to be read-only memory, updating the first set of memory cells to be write-only memory, updating the first set of memory cells to be writeable or readable memory.

In some examples, the command is to override the protection attribute of the first set of memory cells and the protection state component 535 may be configured as or otherwise support a means for overriding the protection attribute of the first set of memory cells based at least in part on decrypting at least the portion of the command.

In some examples, the command includes an access command to access one or more memory cells of the first set of memory cells. In some examples, the access command to access the one or more memory cells of the first set of memory cells includes a read command or a write command.

In some examples, to support overriding the protection attribute, the protection state component 535 may be configured as or otherwise support a means for overriding the protection attribute of the first set of memory cells for a duration, the duration associated with accessing one or more memory cells of the first set of memory cells.

In some examples, the memory range component 550 may be configured as or otherwise support a means for receiving signaling indicating that the first set of memory cells is associated with the host system.

In some examples, to support receiving the signaling, the memory range component 550 may be configured as or otherwise support a means for receiving a logical block address corresponding to an endpoint of an address range for the first set of memory cells and an indication of a length of the address range.

In some examples, the memory key component 540 may be configured as or otherwise support a means for storing the first cryptographic key in at least a portion of the first set of memory cells. In some examples, the first cryptographic key includes a public key, and the second cryptographic key includes a private key. In some examples, the first cryptographic key and the second cryptographic key include a same key.

In some examples, the memory key component 540 may be configured as or otherwise support a means for generating a symmetric key based at least in part on a Diffie-Hellman asymmetric key pair associated with the host system and the first set of memory cells, where the first cryptographic key and the second cryptographic key include the symmetric key. In some examples, the memory system is shared by a plurality of host systems that are each associated with one or more corresponding sets of memory cells of the memory system.

Figure 6:
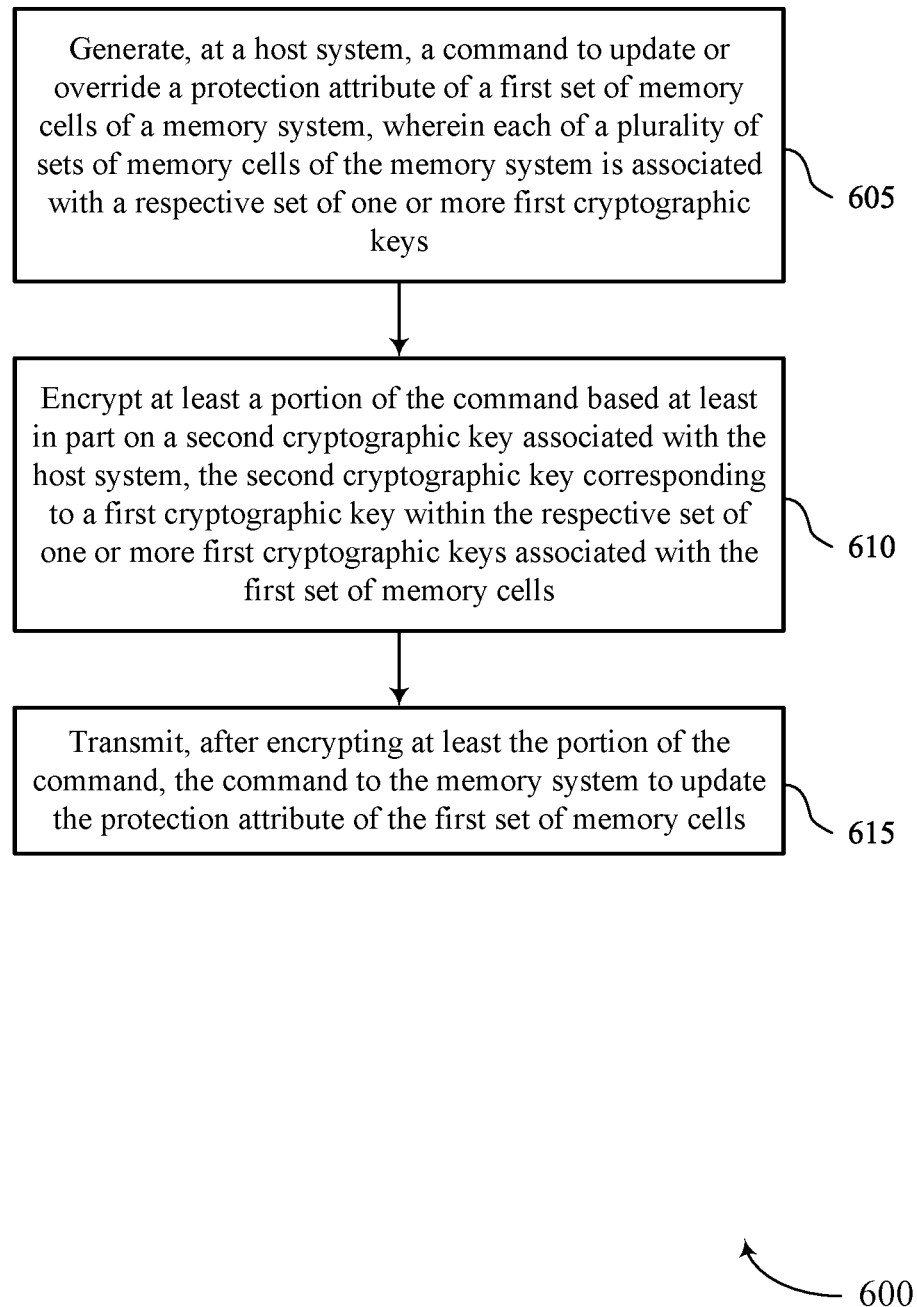
FIGS. 6 through 9 show flowcharts illustrating a method or methods that support partitioned cryptographic protection for a memory system in accordance with examples as disclosed herein.

FIG. 6 shows a flowchart illustrating a method 600 that supports partitioned cryptographic protection for a memory system in accordance with examples as disclosed herein. The operations of method 600 may be implemented by a host system or its components as described herein. For example, the operations of method 600 may be performed by a host system as described with reference to FIGS. 1 through 4. In some examples, a host system may execute a set of instructions to control the functional elements of the device to perform the described functions. Additionally, or alternatively, the host system may perform aspects of the described functions using special-purpose hardware.

At 605, the method may include generating, at a host system, a command to update or override a protection attribute of a first set of memory cells of a memory system, where each of a plurality of sets of memory cells of the memory system is associated with a respective set of one or more first cryptographic keys. The operations of 605 may be performed in accordance with examples as disclosed herein. In some examples, aspects of the operations of 605 may be performed by a command generator 425 as described with reference to FIG. 4.

At 610, the method may include encrypting at least a portion of the command based at least in part on a second cryptographic key associated with the host system, the second cryptographic key corresponding to a first cryptographic key within the respective set of one or more first cryptographic keys associated with the first set of memory cells. The operations of 610 may be performed in accordance with examples as disclosed herein. In some examples, aspects of the operations of 610 may be performed by an encryption component 430 as described with reference to FIG. 4.

At 615, the method may include transmitting, after encrypting at least the portion of the command, the command to the memory system to update the protection attribute of the first set of memory cells. The operations of 615 may be performed in accordance with examples as disclosed herein. In some examples, aspects of the operations of 615 may be performed by a command transmitter 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for generating, at a host system, a command to update or override a protection attribute of a first set of memory cells of a memory system, where each of a plurality of sets of memory cells of the memory system is associated with a respective set of one or more first cryptographic keys; encrypting at least a portion of the command based at least in part on a second cryptographic key associated with the host system, the second cryptographic key corresponding to a first cryptographic key within the respective set of one or more first cryptographic keys associated with the first set of memory cells; and transmitting, after encrypting at least the portion of the command, the command to the memory system to update the protection attribute of the first set of memory cells.

Aspect 2: The method, apparatus, or non-transitory computer-readable medium of aspect 1, further including operations, features, circuitry, logic, means, or instructions, or any combination thereof for updating the second cryptographic key based at least in part on a trigger event or a schedule.

Aspect 3: The method, apparatus, or non-transitory computer-readable medium of any of aspects 1 through 2, where each of the plurality of sets of memory cells of the memory system is associated with a respective cleartext password and the method, apparatuses, and non-transitory computer-readable medium further includes operations, features, circuitry, logic, means, or instructions, or any combination thereof for transmitting, in association with the command to update the protection attribute of the first set of memory cells, a cleartext password associated with the first set of memory cells.

Aspect 4: The method, apparatus, or non-transitory computer-readable medium of any of aspects 1 through 3, where the first set of memory cells is shared by the host system and a second host system.

Aspect 5: The method, apparatus, or non-transitory computer-readable medium of aspect 4, further including operations, features, circuitry, logic, means, or instructions, or any combination thereof for encrypting at least a second portion of the command based at least in part on a third cryptographic key associated with the second host system, the third cryptographic key associated with an additional first cryptographic key associated with the first set of memory cells.

Aspect 6: The method, apparatus, or non-transitory computer-readable medium of any of aspects 1 through 5, where the command is to update the protection attribute of the first set of memory cells, the command including a command to update the first set of memory cells to be read-only memory, a command to update the first set of memory cells to be write-only memory, or a command to update the first set of memory cells to be writeable or readable memory.

Aspect 7: The method, apparatus, or non-transitory computer-readable medium of aspects 1 through 5, where the command is to override the protection attribute of the first set of memory cells, the command including a read command or a write command.

Aspect 8: The method, apparatus, or non-transitory computer-readable medium of any of aspects 1 through 7, further including operations, features, circuitry, logic, means, or instructions, or any combination thereof for transmitting signaling indicating that the first set of memory cells is associated with the host system.

Aspect 9: The method, apparatus, or non-transitory computer-readable medium of aspect 8, where transmitting the signaling includes operations, features, circuitry, logic, means, or instructions, or any combination thereof for transmitting a logical block address corresponding to an endpoint of an address range for the first set of memory cells and an indication of a length of the address range.

Aspect 10: The method, apparatus, or non-transitory computer-readable medium of any of aspects 1 through 9, further including operations, features, circuitry, logic, means, or instructions, or any combination thereof for storing the second cryptographic key in memory included in the host system.

Aspect 11: The method, apparatus, or non-transitory computer-readable medium of any of aspects 1 through 10, where the first cryptographic key includes a public key and the second cryptographic key includes a private key.

Aspect 12: The method, apparatus, or non-transitory computer-readable medium of any of aspects 1 through 10, where the first cryptographic key and the second cryptographic key include a same key.

Aspect 13: The method, apparatus, or non-transitory computer-readable medium of any of aspects 1 through 10, further including operations, features, circuitry, logic, means, or instructions, or any combination thereof for generating a symmetric key based at least in part on a Diffie-Hellman asymmetric key pair associated with the host system and the first set of memory cells, where the first cryptographic key and the second cryptographic key include the symmetric key.

Aspect 14: The method, apparatus, or non-transitory computer-readable medium of any of aspects 1 through 13, where the memory system is shared by a plurality of host systems that are each associated with one or more corresponding sets of memory cells of the memory system.

Figure 7:
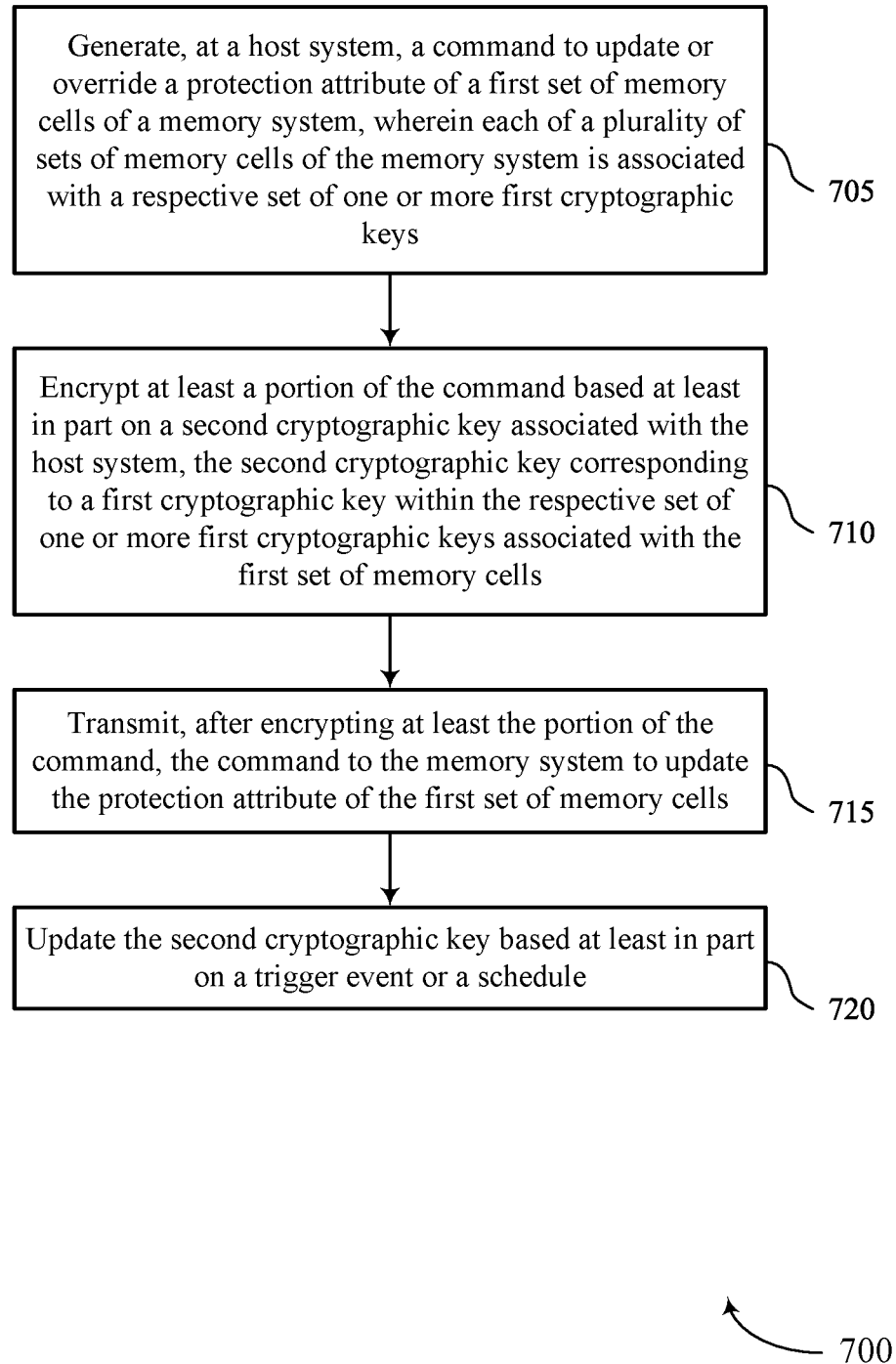

FIG. 7 shows a flowchart illustrating a method 700 that supports partitioned cryptographic protection for a memory system in accordance with examples as disclosed herein. The operations of method 700 may be implemented by a host system or its components as described herein. For example, the operations of method 700 may be performed by a host system as described with reference to FIGS. 1 through 4. In some examples, a host system may execute a set of instructions to control the functional elements of the device to perform the described functions. Additionally, or alternatively, the host system may perform aspects of the described functions using special-purpose hardware.

At 705, the method may include generating, at a host system, a command to update or override a protection attribute of a first set of memory cells of a memory system, where each of a plurality of sets of memory cells of the memory system is associated with a respective set of one or more first cryptographic keys. The operations of 705 may be performed in accordance with examples as disclosed herein. In some examples, aspects of the operations of 705 may be performed by a command generator 425 as described with reference to FIG. 4.

At 710, the method may include encrypting at least a portion of the command based at least in part on a second cryptographic key associated with the host system, the second cryptographic key corresponding to a first cryptographic key within the respective set of one or more first cryptographic keys associated with the first set of memory cells. The operations of 710 may be performed in accordance with examples as disclosed herein. In some examples, aspects of the operations of 710 may be performed by an encryption component 430 as described with reference to FIG. 4.

At 715, the method may include transmitting, after encrypting at least the portion of the command, the command to the memory system to update the protection attribute of the first set of memory cells. The operations of 715 may be performed in accordance with examples as disclosed herein. In some examples, aspects of the operations of 715 may be performed by a command transmitter 435 as described with reference to FIG. 4.

At 720, the method may include updating the second cryptographic key based at least in part on a trigger event or a schedule. The operations of 720 may be performed in accordance with examples as disclosed herein. In some examples, aspects of the operations of 720 may be performed by a host key component 440 as described with reference to FIG. 4.

Figure 8:
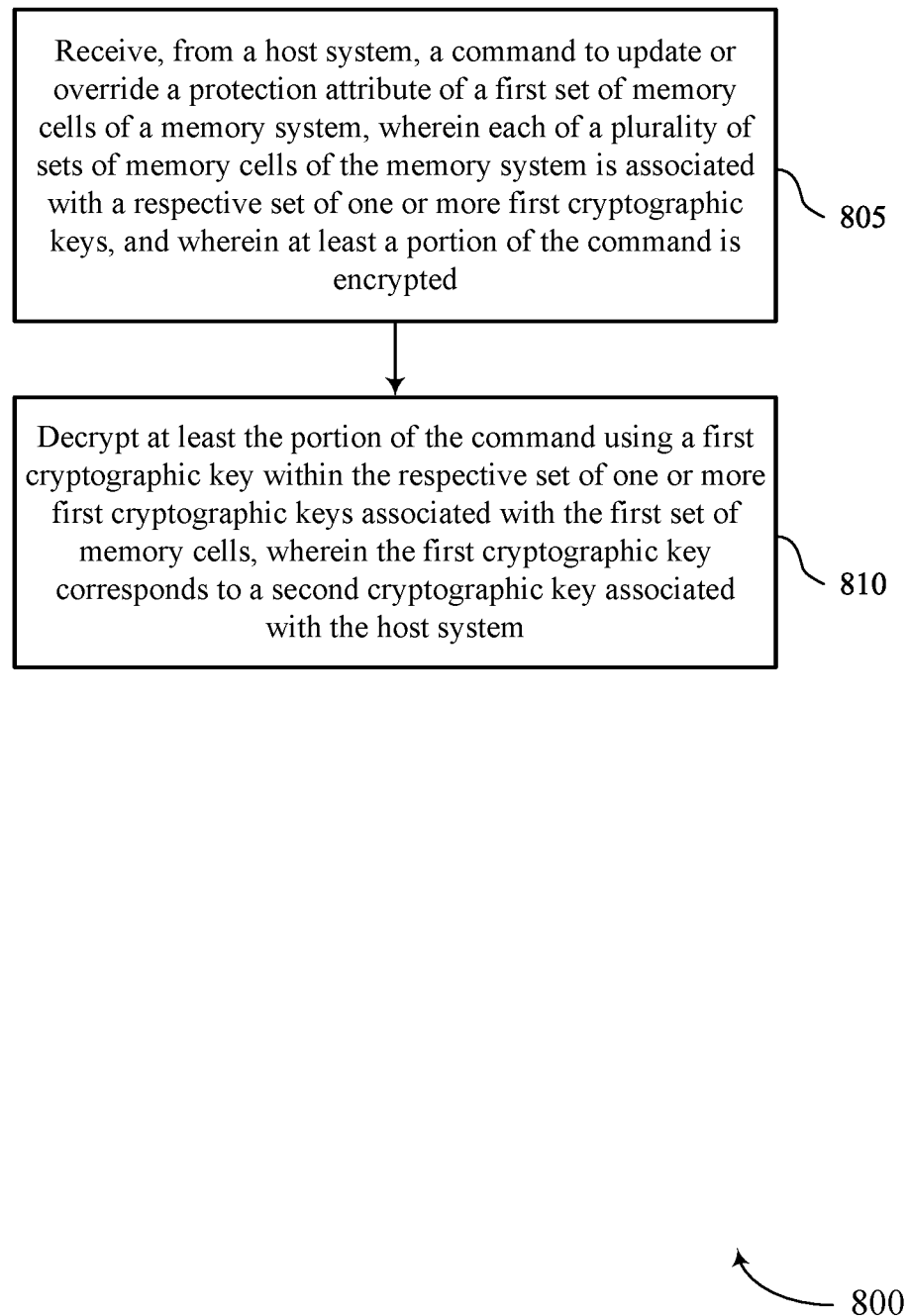

FIG. 8 shows a flowchart illustrating a method 800 that supports partitioned cryptographic protection for a memory system in accordance with examples as disclosed herein. The operations of method 800 may be implemented by a memory system or its components as described herein. For example, the operations of method 800 may be performed by a memory system as described with reference to FIGS. 1 through 3 and 5. In some examples, a memory system may execute a set of instructions to control the functional elements of the device to perform the described functions. Additionally, or alternatively, the memory system may perform aspects of the described functions using special-purpose hardware.

At 805, the method may include receiving, from a host system, a command to update or override a protection attribute of a first set of memory cells of a memory system, where each of a plurality of sets of memory cells of the memory system is associated with a respective set of one or more first cryptographic keys, and where at least a portion of the command is encrypted. The operations of 805 may be performed in accordance with examples as disclosed herein. In some examples, aspects of the operations of 805 may be performed by a command receiver 525 as described with reference to FIG. 5.

At 810, the method may include decrypting at least the portion of the command using a first cryptographic key within the respective set of one or more first cryptographic keys associated with the first set of memory cells, where the first cryptographic key corresponds to a second cryptographic key associated with the host system. The operations of 810 may be performed in accordance with examples as disclosed herein. In some examples, aspects of the operations of 810 may be performed by a decryption component 530 as described with reference to FIG. 5.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 15: A method, apparatus, or non-transitory computer-readable medium including operations, features, circuitry, logic, means, or instructions, or any combination thereof for receiving, from a host system, a command to update or override a protection attribute of a first set of memory cells of a memory system, where each of a plurality of sets of memory cells of the memory system is associated with a respective set of one or more first cryptographic keys, and where at least a portion of the command is encrypted and decrypting at least the portion of the command using a first cryptographic key within the respective set of one or more first cryptographic keys associated with the first set of memory cells, where the first cryptographic key corresponds to a second cryptographic key associated with the host system.

Aspect 16: The method, apparatus, or non-transitory computer-readable medium of aspect 15, further including operations, features, circuitry, logic, means, or instructions, or any combination thereof for updating the first cryptographic key based at least in part on a trigger event or a schedule.

Aspect 17: The method, apparatus, or non-transitory computer-readable medium of any of aspects 15 through 16, where each of the plurality of sets of memory cells of the memory system is associated with a respective cleartext password and the method, apparatuses, and non-transitory computer-readable medium further includes operations, features, circuitry, logic, means, or instructions, or any combination thereof for receiving, in association with command to update the protection attribute of the first set of memory cells, a cleartext password associated with the first set of memory cells and decrypting the command using the cleartext password associated with the first set of memory cells.

Aspect 18: The method, apparatus, or non-transitory computer-readable medium of any of aspects 15 through 17, where the first set of memory cells is shared by the host system and a second host system.

Aspect 19: The method, apparatus, or non-transitory computer-readable medium of aspect 18, further including operations, features, circuitry, logic, means, or instructions, or any combination thereof for decrypting at least a second portion of the command based at least in part on an additional first cryptographic key associated with the first set of memory cells, the additional first cryptographic key associated with a third cryptographic key associated with the second host system.

Aspect 20: The method, apparatus, or non-transitory computer-readable medium of any of aspects 15 through 19, where the command is to update the protection attribute of the first set of memory cells, and the method, apparatus, or non-transitory computer-readable medium further including operations, features, circuitry, logic, means, or instructions, or any combination thereof for updating the protection attribute of the first set of memory cells based at least in part on decrypting at least the portion of the command. In some examples, updating the protection attribute includes operations, features, circuitry, logic, means, or instructions, or any combination thereof for updating the protection attribute of first set of memory cells to be read-only memory; updating the first set of memory cells to be write-only memory; and updating the first set of memory cells to be writeable or readable memory.

Aspect 21: The method, apparatus, or non-transitory computer-readable medium of any of aspects 15 through 19, where the command is to override the protection attribute of the first set of memory cells, and the method, apparatus, or non-transitory computer-readable medium further including operations, features, circuitry, logic, means, or instructions, or any combination thereof for overriding the protection attribute of the first set of memory cells based at least in part on decrypting at least the portion of the command.

Aspect 22: The method, apparatus, or non-transitory computer-readable medium of aspect 21, where the command includes an access command to access one or more memory cells of the first set of memory cells.

Aspect 23: The method, apparatus, or non-transitory computer-readable medium of aspect 22, where the access command to access the one or more memory cells of the first set of memory cells includes a read command or a write command.

Aspect 24: The method, apparatus, or non-transitory computer-readable medium of any of aspects 21 through 23, where overriding the protection attribute includes operations, features, circuitry, logic, means, or instructions, or any combination thereof for overriding the protection attribute of the first set of memory cells for a duration, the duration associated with accessing one or more memory cells of the first set of memory cells.

Aspect 25: The method, apparatus, or non-transitory computer-readable medium of any of aspects 15 through 24, further including operations, features, circuitry, logic, means, or instructions, or any combination thereof for receiving signaling indicating that the first set of memory cells is associated with the host system.

Aspect 26: The method, apparatus, or non-transitory computer-readable medium of aspect 25, where receiving the signaling includes operations, features, circuitry, logic, means, or instructions, or any combination thereof for receiving a logical block address corresponding to an endpoint of an address range for the first set of memory cells and an indication of a length of the address range.

Aspect 27: The method, apparatus, or non-transitory computer-readable medium of any of aspects 15 through 26, further including operations, features, circuitry, logic, means, or instructions, or any combination thereof for storing the first cryptographic key in at least a portion of the first set of memory cells.

Aspect 28: The method, apparatus, or non-transitory computer-readable medium of any of aspects 15 through 27, where the first cryptographic key includes a public key and the second cryptographic key includes a private key.

Aspect 29: The method, apparatus, or non-transitory computer-readable medium of any of aspects 15 through 28, where the first cryptographic key and the second cryptographic key include a same key.

Aspect 30: The method, apparatus, or non-transitory computer-readable medium of any of aspects 15 through 29, further including operations, features, circuitry, logic, means, or instructions, or any combination thereof for generating a symmetric key based at least in part on a Diffie-Hellman asymmetric key pair associated with the host system and the first set of memory cells, where the first cryptographic key and the second cryptographic key include the symmetric key.

Aspect 31: The method, apparatus, or non-transitory computer-readable medium of any of aspects 15 through 30, where the memory system is shared by a plurality of host systems that are each associated with one or more corresponding sets of memory cells of the memory system.

Figure 9:
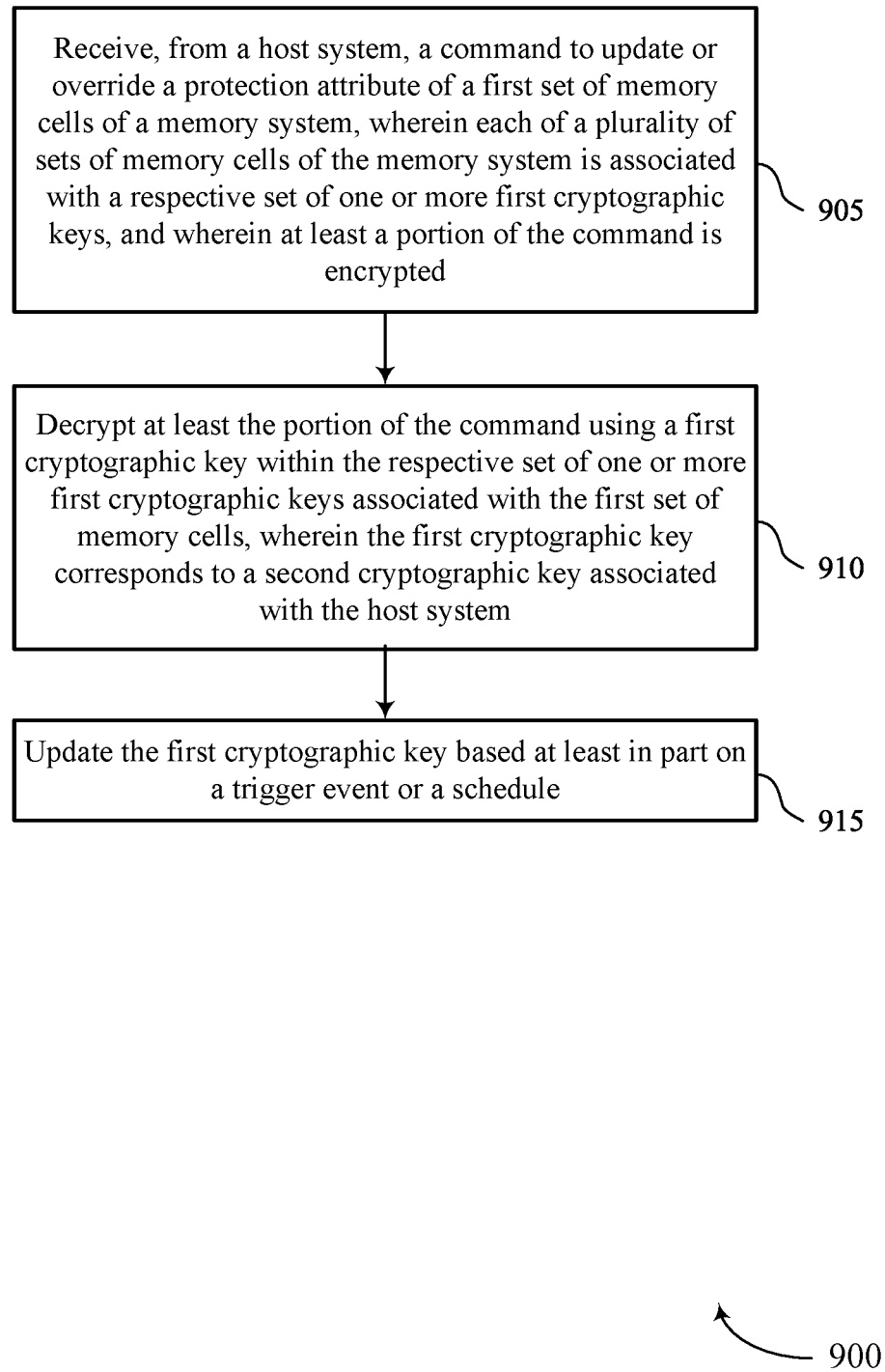

FIG. 9 shows a flowchart illustrating a method 900 that supports partitioned cryptographic protection for a memory system in accordance with examples as disclosed herein. The operations of method 900 may be implemented by a memory system or its components as described herein. For example, the operations of method 900 may be performed by a memory system as described with reference to FIGS. 1 through 3 and 5. In some examples, a memory system may execute a set of instructions to control the functional elements of the device to perform the described functions. Additionally, or alternatively, the memory system may perform aspects of the described functions using special-purpose hardware.

At 905, the method may include receiving, from a host system, a command to update a protection attribute of a first set of memory cells of a memory system, where each of a plurality of sets of memory cells of the memory system is associated with a respective set of one or more first cryptographic keys, and where at least a portion of the command is encrypted. The operations of 905 may be performed in accordance with examples as disclosed herein. In some examples, aspects of the operations of 905 may be performed by a command receiver 525 as described with reference to FIG. 5.

At 910, the method may include decrypting at least the portion of the command using a first cryptographic key within the respective set of one or more first cryptographic keys associated with the first set of memory cells, where the first cryptographic key corresponds to a second cryptographic key associated with the host system. The operations of 910 may be performed in accordance with examples as disclosed herein. In some examples, aspects of the operations of 910 may be performed by a decryption component 530 as described with reference to FIG. 5.

At 915, the method may include updating the first cryptographic key based at least in part on a trigger event or a schedule. The operations of 915 may be performed in accordance with examples as disclosed herein. In some examples, aspects of the operations of 915 may be performed by a memory key component 540 as described with reference to FIG. 5.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and a second condition or action may occur directly as a result of the previous condition or action occurring independent of whether other conditions or actions occur. In some examples, a first condition or action may be performed and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a controller configured to couple with a memory system, wherein the controller is configured to cause the apparatus to:
generate, at a host system for the memory system, a command to update or override a protection attribute of a first set of memory cells of the memory system, wherein each of a plurality of sets of memory cells of the memory system is associated with a respective set of one or more first cryptographic keys;
encrypt, at the host system for the memory system, at least a portion of the command based at least in part on a second cryptographic key associated with the host system, the second cryptographic key corresponding to a first cryptographic key within the respective set of one or more first cryptographic keys associated with the first set of memory cells; and
transmit, after encrypting at least the portion of the command at the host system, the command to update the protection attribute of the first set of memory cells.

2. The apparatus of claim 1, wherein the controller is further configured to cause the apparatus to:
update the second cryptographic key based at least in part on a trigger event or a schedule.

3. The apparatus of claim 1, wherein each of the plurality of sets of memory cells of the memory system is associated with a respective cleartext password, and wherein the controller is further configured to cause the apparatus to:
  transmit, in association with the command to update the protection attribute of the first set of memory cells, a cleartext password associated with the first set of memory cells.

4. The apparatus of claim 1, wherein the first set of memory cells is shared by the host system and a second host system.

5. The apparatus of claim 4, wherein the controller is further configured to cause the apparatus to:
  encrypt at least a second portion of the command based at least in part on a third cryptographic key associated with the second host system, the third cryptographic key associated with an additional first cryptographic key associated with the first set of memory cells.

6. The apparatus of claim 1, wherein the command is to update the protection attribute of the first set of memory cells, the command comprising:
  a command to update the first set of memory cells to be read-only memory;
  a command to update the first set of memory cells to be write-only memory; or
  a command to update the first set of memory cells to be writeable or readable memory.

7. The apparatus of claim 1, wherein the command is to override the protection attribute of the first set of memory cells, and wherein the command comprises a read command or a write command.

8. The apparatus of claim 1, wherein the controller is further configured to cause the apparatus to:
  store the second cryptographic key in memory included in the host system.

9. The apparatus of claim 1, wherein the controller is further configured to cause the apparatus to:
  generate a symmetric key based at least in part on a Diffie-Hellman asymmetric key pair associated with the host system and the first set of memory cells, wherein the first cryptographic key and the second cryptographic key comprise the symmetric key.

10. The apparatus of claim 1, wherein the memory system is shared by a plurality of host systems that are each associated with one or more corresponding sets of memory cells of the memory system.

11. An apparatus, comprising:
  a memory system; and
  a controller for the memory system and configured to cause the apparatus to:
    receive, from a host system for the memory system, a command to update or override a protection attribute of a first set of memory cells of the memory system, wherein each of a plurality of sets of memory cells of the memory system is associated with a respective set of one or more first cryptographic keys, and wherein at least a portion of the command is encrypted; and
    decrypt, at the memory system, at least the portion of the command from the host system using a first cryptographic key within the respective set of one or more first cryptographic keys associated with the first set of memory cells, wherein the first cryptographic key corresponds to a second cryptographic key associated with the host system.

12. The apparatus of claim 11, wherein the controller is further configured to cause the apparatus to:
  update the first cryptographic key based at least in part on a trigger event or a schedule.

13. The apparatus of claim 11, wherein each of the plurality of sets of memory cells of the memory system is associated with a respective cleartext password, and wherein the controller is further configured to cause the apparatus to:
  receive, in association with the command to update the protection attribute of the first set of memory cells, a cleartext password associated with the first set of memory cells; and
  decrypt the command using the cleartext password associated with the first set of memory cells.

14. The apparatus of claim 11, wherein the first set of memory cells is shared by the host system and a second host system.

15. The apparatus of claim 14, wherein the controller is further configured to cause the apparatus to:
  decrypt at least a second portion of the command based at least in part on an additional first cryptographic key associated with the first set of memory cells, the additional first cryptographic key associated with a third cryptographic key associated with the second host system.

16. The apparatus of claim 11, wherein the command is to update the protection attribute of the first set of memory cells and wherein the controller is configured to cause the apparatus to:
  update the protection attribute of the first set of memory cells based at least in part on decrypting at least the portion of the command, wherein, to update the protection attribute, the controller is configured to cause the apparatus to:
    update the first set of memory cells to be read-only memory;
    update the first set of memory cells to be write-only memory; or
    update the first set of memory cells to be writeable or readable memory.

17. The apparatus of claim 11, wherein the command is to override the protection attribute of the first set of memory cells, and wherein the controller is configured to cause the apparatus to:
  override the protection attribute of the first set of memory cells based at least in part on decrypting at least the portion of the command.

18. The apparatus of claim 17, wherein the command comprises an access command to access one or more memory cells of the first set of memory cells.

19. The apparatus of claim 17, wherein, to override the protection attribute, the controller is configured to cause the apparatus to:
  override the protection attribute of the first set of memory cells for a duration, the duration associated with accessing one or more memory cells of the first set of memory cells.

20. A non-transitory computer-readable medium storing code comprising instructions which, when executed by a processor of an electronic device, cause the electronic device to:
  generate, at a host system for a memory system, a command to update or override a protection attribute of a first set of memory cells of the memory system, wherein each of a plurality of sets of memory cells of the memory system is associated with a respective set of one or more first cryptographic keys;
  encrypt, at the host system for the memory system, at least a portion of the command based at least in part on a second cryptographic key associated with the host system, the second cryptographic key corresponding to a first cryptographic key within the respective set of one or more first cryptographic keys associated with the first set of memory cells; and transmit, after encrypting at least the portion of the command at the host system, the command to the memory system to update the protection attribute of the first set of memory cells.

\* \* \* \* \*